United States Patent
Kiyokawa

[11] Patent Number: 6,163,321
[45] Date of Patent: *Dec. 19, 2000

[54] IMAGE PROCESSING APPARATUS AND METHOD THEREOF

[75] Inventor: Jun Kiyokawa, Kawasaki, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/579,361

[22] Filed: Dec. 27, 1995

[30] Foreign Application Priority Data

Dec. 28, 1994 [JP] Japan .................................. 6-327453

[51] Int. Cl.$^7$ .................................................. G06T 11/40
[52] U.S. Cl. ............................................................. 345/431
[58] Field of Search .............................. 395/131; 345/431

[56] References Cited

U.S. PATENT DOCUMENTS

| | | | |
|---|---|---|---|
| 5,515,172 | 5/1996 | Shiau | 358/298 |
| 5,630,038 | 5/1997 | Itoh et al. | 395/131 |

FOREIGN PATENT DOCUMENTS

| | | |
|---|---|---|
| 0481525 | 4/1992 | European Pat. Off. . |
| 0536892 | 4/1993 | European Pat. Off. . |
| 0546773 | 6/1993 | European Pat. Off. . |
| 4343362 | 10/1994 | Germany . |
| 2208460 | 3/1989 | United Kingdom . |

OTHER PUBLICATIONS

"Linocolor 3.1, Neue Funktionen," Mar. 1993, Linotype—Hell AG, ESchborn, Germany, pp. 6.1–9.25.

*Primary Examiner*—Mark Zimmerman
*Assistant Examiner*—Mano Padmanabhan
*Attorney, Agent, or Firm*—Fitzpatrick, Cella, Harper & Scinto

[57] ABSTRACT

An image obtains a desired impression by adjusting a color on the basis of a color adjustment parameter which responds to input image data. An image processing apparatus includes storage means which stores image data having different hues, and an input device inputs image data to be color adjusted. A color adjustment unit performs a color adjustment to at least one of hue, saturation and lightness of the image data to be color adjusted using a color adjustment parameter. The color adjustment parameter responds to each of the hue, saturation and lightness of the image data to be color adjusted on the basis of the stored image data. The stored image data is selected on the basis of the hue of the image data to be color adjusted.

8 Claims, 6 Drawing Sheets

ALREADY-SET PAIR OF COLORS IS DISPLAYED AND SELECTED IN THE ORDER OF HUE, IN THIS LIST

NEW PAIR OF COLORS IS FORMED

GAMUT OF R' HUE PLANE (DESIGNATING R' ON a-b PLANE)

GAMUT OF R HUE PLANE (DESIGNATING R ON a-b PLANE)

FIG. 7B

IMAGE PROCESSING APPARATUS AND METHOD THEREOF

BACKGROUND OF THE INVENTION

1. Field of the Invention

The present invention relates to an image processing apparatus and method for performing a color adjustment.

2. Related Background Art

Hitherto, as a color adjustment method, there is known a method for adjusting all colors contained in an image on the basis of a parameter used for converting a specific input color in an image into a specific output color.

That is, concretely, a color adjustment is performed by converting input image data by using a matrix parameter used for converting the input image data which indicates such a specific color as a skin color or the like into image data which indicates a desired skin color.

In a conventional color adjustment method, a desired color adjustment is performed for the specific input color. However, such a color adjustment while disregarding the overall color appearance is compelled to be performed for other colors, because the color adjustment is performed by using the same parameter for an entire image. Therefore, there occurs a problem such as an impression of an image formed by after-adjustment colors differs from an impression of an image formed by before-adjustment colors.

SUMMARY OF THE INVENTION

The present invention is applied in consideration of the above-mentioned problem, and an object of the present invention is to simply provide an image in which a desired impression is obtained by adjusting colors on the basis of a color adjustment parameter corresponding to input image data.

Another object of the present invention is to realize such a state that a color adjustment does not influence an achromatic color when the color adjustment is performed.

The above and other objects of the present invention will become apparent from the following detail description on the basis of the attached drawings.

DETAILED DESCRIPTION OF THE PREFERRED EMBODIMENTS

An embodiment of the present invention is described hereinafter. In the embodiment, it should be noted that the same reference numeral denotes the same object through all drawings.

(First Embodiment)

A first embodiment of the present invention is described in detail hereinafter with reference to the attached drawings.

Figure 1:
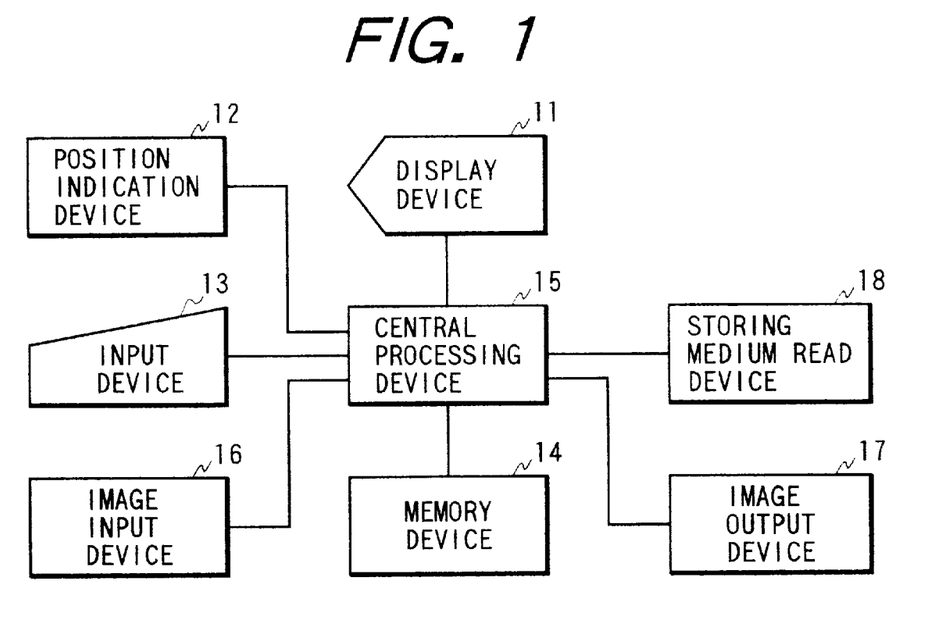
FIG. 1 is a block diagram showing an example of an image processing apparatus according to a first embodiment of the present invention.

FIG. 1 is a block diagram showing an example of an image processing apparatus according to the present invention.

A display device 11 is composed of a CRT, a liquid crystal display or the like. A position indication device 12 is composed of a mouse, a light pen or the like which indicates a position of information displayed on the display device 11. An input device 13, for example, a key board or the like, inputs information such as characters, numerals and the like. A memory device 14 stores a program for entirely controlling a color adjustment device, generated data or the like. A central processing device 15 entirely controls the color adjustment device. The device 15 performs such control as displaying information on the display device 11, confirming information indicated by the position indication device 12 and the input device 13, reading out necessary data from the memory device 14, or the like.

An image input device 16 is composed of a scanner, a video camera or the like. An image output device 17 is composed of a printer or the like. A storing medium read device 18 reads such information as a program, data or the like from a storing medium such as a floppy disk in which a program for controlling a part of, or an entire image edition method is stored. The read information is stored in the memory device 14.

It should be noted that the image input device 16, the image output device 17 and the storing medium read device 18 may be provided if such devices are required.

In the present embodiment, hue components, saturation components and lightness components of all colors depend on the following equation based on a CIE1976 (L* a* b*) color-space. In this case, the hue component is expressed by using an angle. In the present embodiment, it is expressed by using an angle in radian.

$$\begin{cases} L^* : \text{lightness} \\ C^*_{ab} = (a^{*2} + b^{*2})^{\frac{1}{2}} : \text{saturation} \\ h^0_{ab} = \arctan\left(\frac{b^*}{a^*}\right) : \text{hue} \end{cases}$$

A hue value having the same phase each other, for example, the hue value $\pi$ and the hue value $3\pi$ are the same hue, therefore, hue sets (hue groups) are arranged in a circulated permutation if they are arranged based on a size relation.

The hue value is limited within a range of $(-\pi, \pi)$ hereinafter, and a mono-directional hue difference is defined as follows.

$$d_H(h_1, h_2) = \begin{cases} h_1 - h_2 & ((h_1 - h_2) \geq 0), \\ (h_1 - h_2) + 2\pi & ((h_1 - h_2) < 0) \end{cases}$$

In a hue set $\{h_i : 1 \leq i \leq N\}$, a factor $h_R$ which is "closest in clockwise direction" to a certain hue h is equal to $h_j$ which is obtained when $\Delta h_j$ becomes minimized in a set $\{\Delta h_i : 1 \leq i \leq N\}$ if $\Delta h_i = d_H(h, h_i)$. In the hue set $\{h_i : 1 \leq i \leq N\}$, a factor $h_L$, which is "closest in counterclockwise direction" to a certain hue h is equal to $h_j$ which is obtained when $\Delta h_j$ becomes minimized in the set $\{\Delta h_i : 1 \leq i \leq N\}$ if $\Delta h_i = d_H(h_i, h)$.

Figure 4:
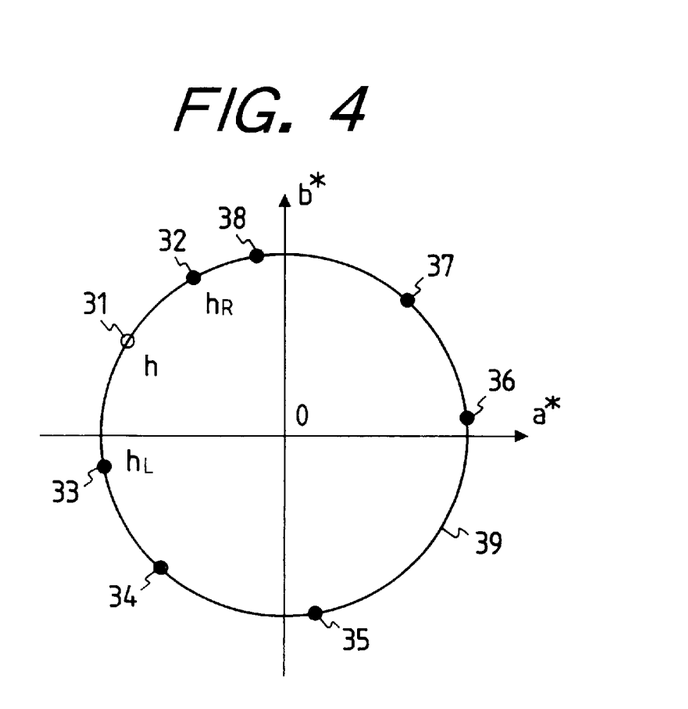
FIG. 4 is a view showing an example which indicates factors of the hue set (group) as dots on a circumference of which center is positioned on an origin of an a*–b* plane called as a hue circle.

FIG. 4 is a view showing an example which indicates factors 32, 33, 34, 35, 36, 37 and 38 as dots on a circumference 39 (called as a hue circle) the center of which is positioned on an origin of an a*–b* plane, because if the hue is expressed by using an angle, the hue sets are arranged in the circulated permutation. In FIG. 4, a hue which is closest to the hue h indicated by the dot 31 in clockwise direction is the hue $h_R$ indicated by the dot 32, and a hue which is closest to the hue h indicated by the dot 31 in counterclockwise direction is a hue $h_L$ indicated by the dot 33.

Figure 2:
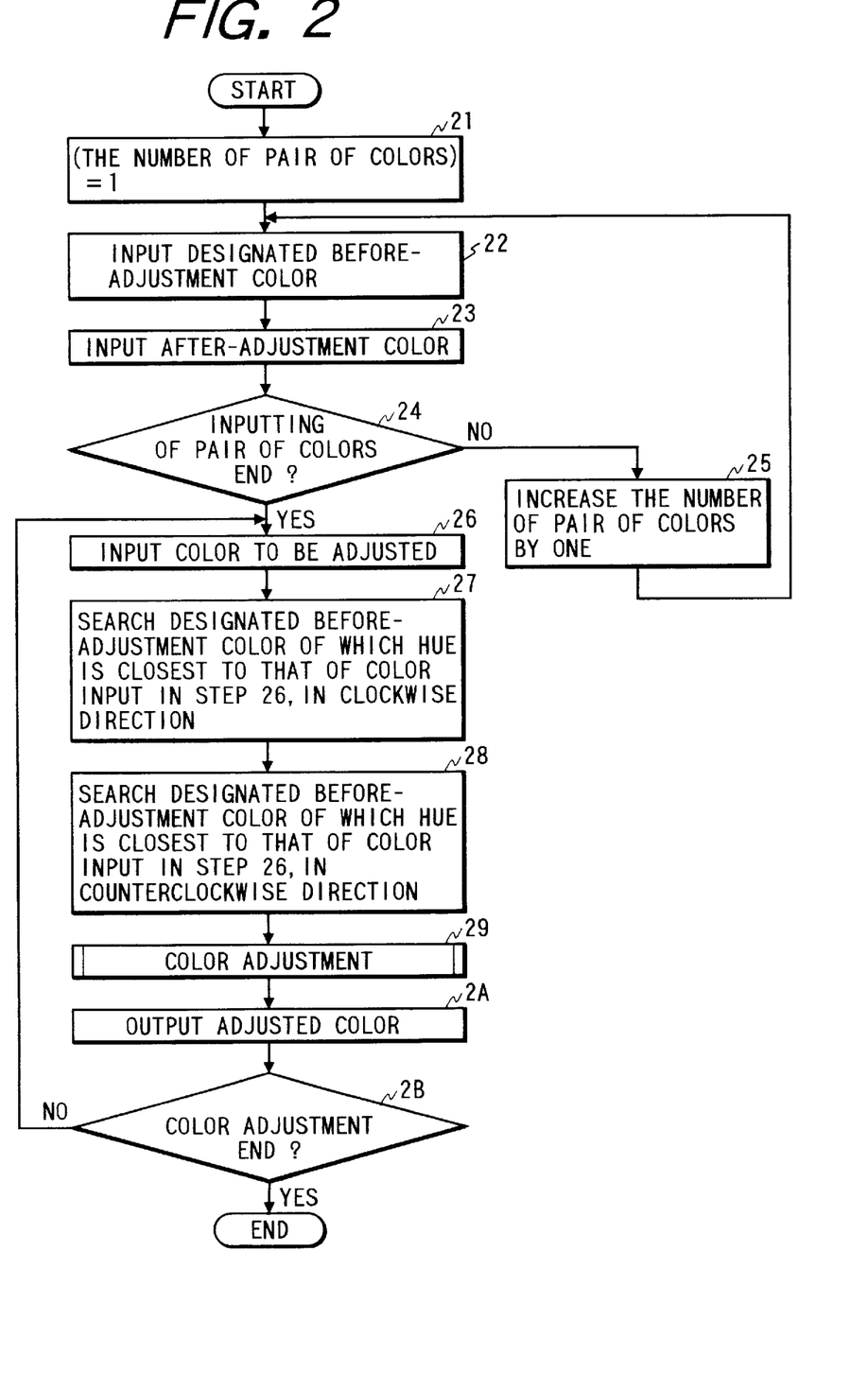
FIG. 2 is a flow chart showing an example of an entire process flow in the first embodiment of the present invention.

FIG. 2 is a flow chart showing an operation flow of a color adjustment method according to the present invention. It should be noted that an operation described in the flow chart in FIG. 2 is performed by the central processing unit 15 on the basis of a control program stored in the memory device 14.

At first, the number of a pair of color is set as 1, that is, an initialization is performed (step 21).

Then, a user inputs a before-adjustment color to be designated by using the input device 13 (step 22) and inputs an after-adjustment color which corresponds to it (before-adjustment color) by using the input device 13 (step 23). Then, it is judged that if a pair of before and after-adjustment colors has already been input (step 24). If it has not been terminated to input the pair of before- and after-adjustment colors, the number of pairs of colors should be increased by one (step 25) and then the flow returns to the step 22. If it has been terminated to input the pair of before- and after-adjustment colors, the flow advances to a step 26.

However, in the steps 22 to 25, when before- and after-adjustment colors are repeatedly input, before- adjustment colors are set to be different from others.

The pair of before- and after-adjustment colors which has been input is stored in the memory device 104. The stored pair of before- and after-adjustment colors may be deleted or may be stored after terminating a color adjustment process.

Here, the total number of pairs of before- and after-adjustment colors is defined as N.

Then, the user performs the color adjustment process. The user inputs a color x to which a color adjustment is performed by using the input device 13 (step 26). The hue component, the saturation component and the lightness component of the color x are assumed as h, c and l, respectively.

A color $x_R$ of which hue is closest to the hue component h of the color x in clockwise direction is searched from the before-adjustment colors which have been input in the steps 22 to 25. The hue component, the saturation component and the lightness component of the color $x_R$ are assumed as $h_R$, $c_R$ and $l_R$, respectively.

Further, a color after performing an adjustment of the color $x_R$ which is input in the step 23 is assumed as $x'_R$. The hue component, the saturation component and the lightness component of the color $x'_R$ are assumed as $h'_R$, $C'_R$ and $l'_R$, respectively (step 27).

A color $x_L$ of which hue is closest to the hue component h of the color x in counterclockwise direction is searched from the before-adjustment colors which have been input in the steps 22 to 25. The hue component, the saturation component and the lightness component of color $x_L$ are assumed as $h_L$, $c_L$ and $l_L$, respectively.

Further, a color after performing an adjustment of the color $x_L$ which is input in the step 23 is assumed as $x'_L$. The hue component, the saturation component and the lightness component of the color $x'_L$ are assumed as $h'_L$, $C'_L$ and $l'_L$, respectively (step 28).

At this time, it is assumed that $\Delta h_{LR}=d_H(h_L, h_R)$, $\Delta h'_{LR}=d_H(h'_L, h'_R)$, $\Delta h_R=d_H(h, h_R)$ and $\Delta h_L=d_H(h_L, h)$.

In this process, the color adjustment is performed, wherein the hue component, the saturation component and the lightness component of colors to be color adjusted are calculated. (step 29).

The color adjustment method is described in detail with reference to FIG. 3.

The lightness component l' of a color x' obtained after performing the color adjustment of the color x is defined as follows (step 2C).

$$\begin{cases} l' = \left(1 + (1'_R - 1_R) \times \frac{C}{C_R}\right) \times \frac{\Delta h_L}{\Delta h_{LR}} + \left(1 + (1'_L - 1_L) \times \frac{C}{C_L}\right) \times \frac{\Delta h_R}{\Delta h_{LR}} & (N \neq 1), \\ l' = 1 + (1'_R - 1_R) \times \frac{C}{C_R} & (N = 1) \end{cases}$$

The saturation component c' of the color x' obtained after performing the color adjustment of the color x is defined as follows (step 2D).

$$\begin{cases} C' = \left(C'_R \times \frac{C}{C_R}\right) \times \frac{\Delta h_L}{\Delta h_{LR}} + \left(C'_L \times \frac{C}{C_L}\right) \times \frac{\Delta h_R}{\Delta h_{LR}} & (N \neq 1), \\ C' = C'_R \times \frac{C}{C_R} & (N = 1) \end{cases}$$

The hue component h' of the color x' obtained after performing the color adjustment of the color x is defined as follows (step 2E).

$$\begin{cases} h' = h'_R + \Delta h'_{LR} \times \frac{\Delta h_R}{\Delta h_{LR}} & (N \neq 1), \\ h' = h + (h'_R - h_R) & (N = 1) \end{cases}$$

Figure 3:
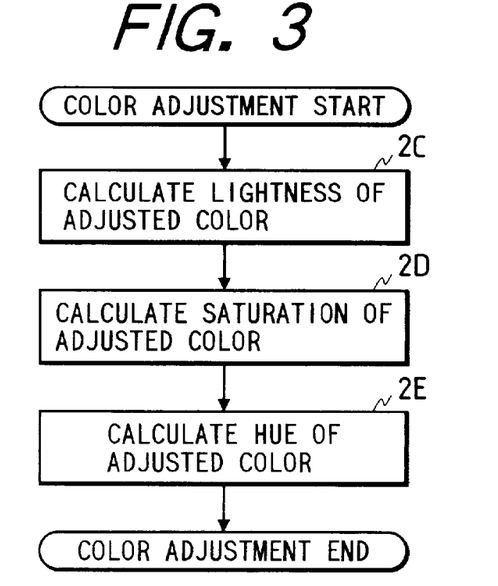
FIG. 3 is a flow chart showing an example of a color adjustment process flow in the first embodiment of the present invention.

As mentioned above, the color adjustment method indicated in FIG. 3 mainly relates to a hue adjustment.

That is, an adjustment is performed by using a hue adjustment parameter which is only based on the hue of colors x, $x_R$, $x'_R$, $x_L$ and $x'_L$ in accordance with a hue adjustment method indicated in the step 2E.

Therefore, since the hue is not influenced by other factors of the lightness and the saturation, the hue is adjusted to a desired hue.

A saturation adjustment indicated in the step 2D is performed based on a saturation adjustment parameter obtained by performing a weighting in accordance with the hue of the color x.

That is, in colors $x_R$ and $x_L$ selected based on the hue, an influence becomes more remarkable by a color which is close to the color x.

Therefore, the saturation adjustment is performed under consideration of the hue adjustment.

A lightness adjustment indicated in the step 2E is performed by using a lightness adjustment parameter which is based on the saturation and the hue.

That is, since calculated results of $C/C_R$ and $C/C_L$ are regarded as parameters, an adjustment range in the lightness becomes narrower when the saturation becomes more weak i.e., a dot representing the saturation is closer to an achromatic axis.

Accordingly, an achromatic color can be accurately reproduced if the color adjustment is performed.

As mentioned above, according to the color adjustment of the present embodiment, since the hue, the saturation and the lightness are adjusted on the basis of the same colors $x_R$ and $x_L$, the color adjustment is performed by associating the hue, the saturation and the lightness with the hue which is regarded as a main factor.

The above-defined color x' after performing the color adjustment is output on the display device 11 (step 2A).

Then, it is judged that if a color to be adjusted has already been input (step 2B). If it has not been terminated to input the color to be adjusted, the flow returns to the step 26. If it has been terminated to input the color to be adjusted, the present color adjustment method is terminated.

According to the present embodiment, if the user inputs only pairs of colors to be adjusted and already-adjusted colors. The before-adjustment colors designated by performing the input in the step 22 are all converted into the corresponding after-adjustment colors designated by performing the input in the step 23. As to other colors, the color adjustment, wherein the conversion is performed according to the pairs of designated before- and after-adjustment colors, can be performed.

That is, the color which is designated is converted into the desired color on the basis of the pair of designated before- and after-adjustment colors. Further, the color which is not designated is converted into the parameter corresponding to the color which is not designated on the basis of the pair of designated before- and after-adjustment colors.

The adjustment is performed by using the parameters corresponding to the respective input colors in order to perform the desired color adjustment to the image.

Therefore, a suitable color adjustment can be performed to colors other than designated colors. As a result, an image having a desired impression can be simply obtained without a complex operation.

Since the before-adjustment colors designated by performing the input operation in the step 22 are all converted into the corresponding after-adjustment colors designated by performing the input operation in the step 23, colors to be intended to output correct colors of a merchandise and its logo can be accurately designated and adjusted.

Simultaneously, since the color which is not designated in the step 22 is varied in response to a color of which hue is closest to the hue of the designated color in clockwise direction, a color of which hue is closest to the hue of the designated color in counterclockwise direction and their respective mono-directional hue differences. Thus, an entire color after adjustment is not polarized, and an achromatic color before adjustment is not varied at all. That is, since it is not varied to a chromatic color, the color adjustment is performed without generating any color polarization which gives an unnatural impression to the user.

(Second Embodiment)

Figure 5:
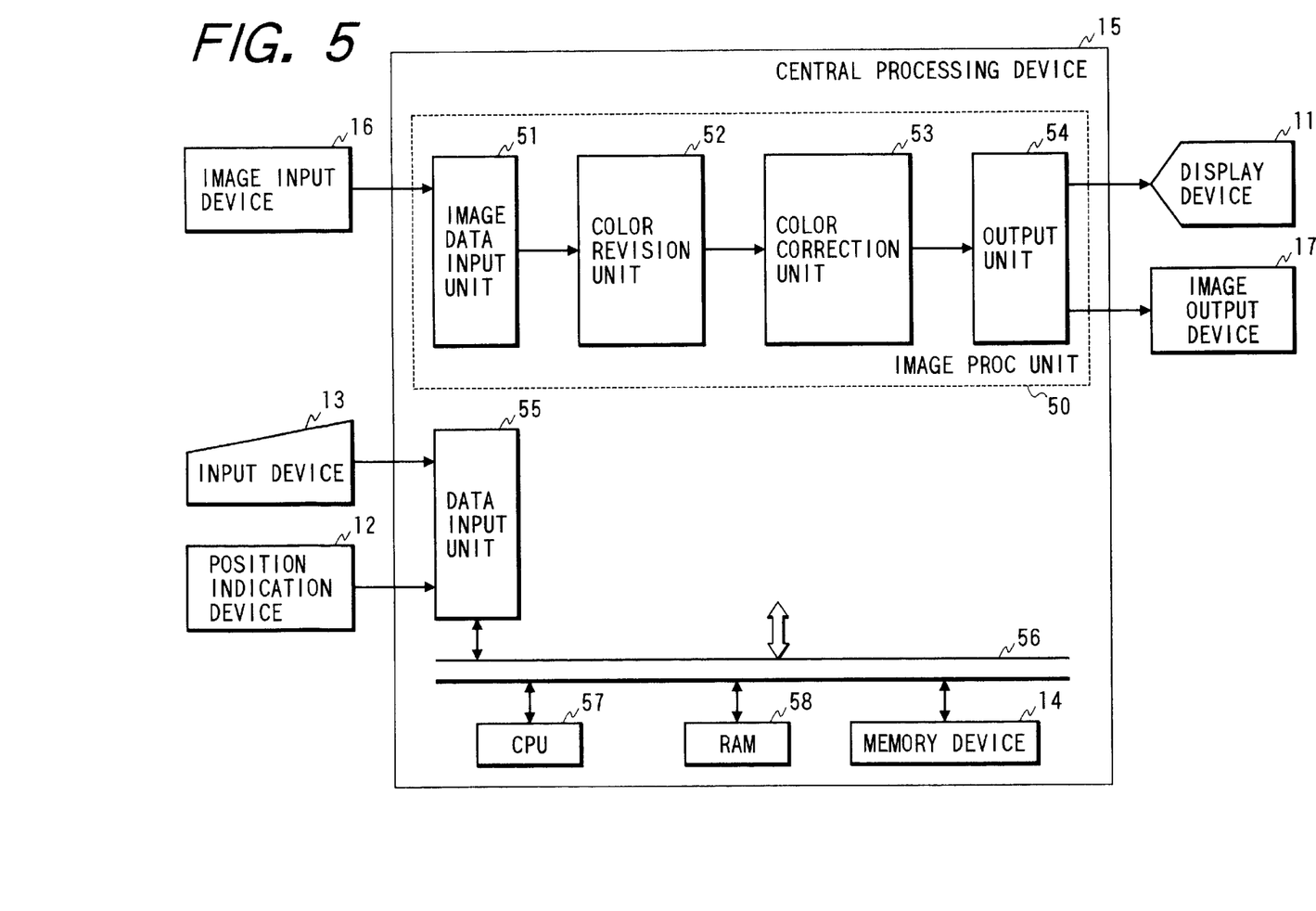
FIG. 5 is a block diagram of a central processing device 15.
Figure 7A:
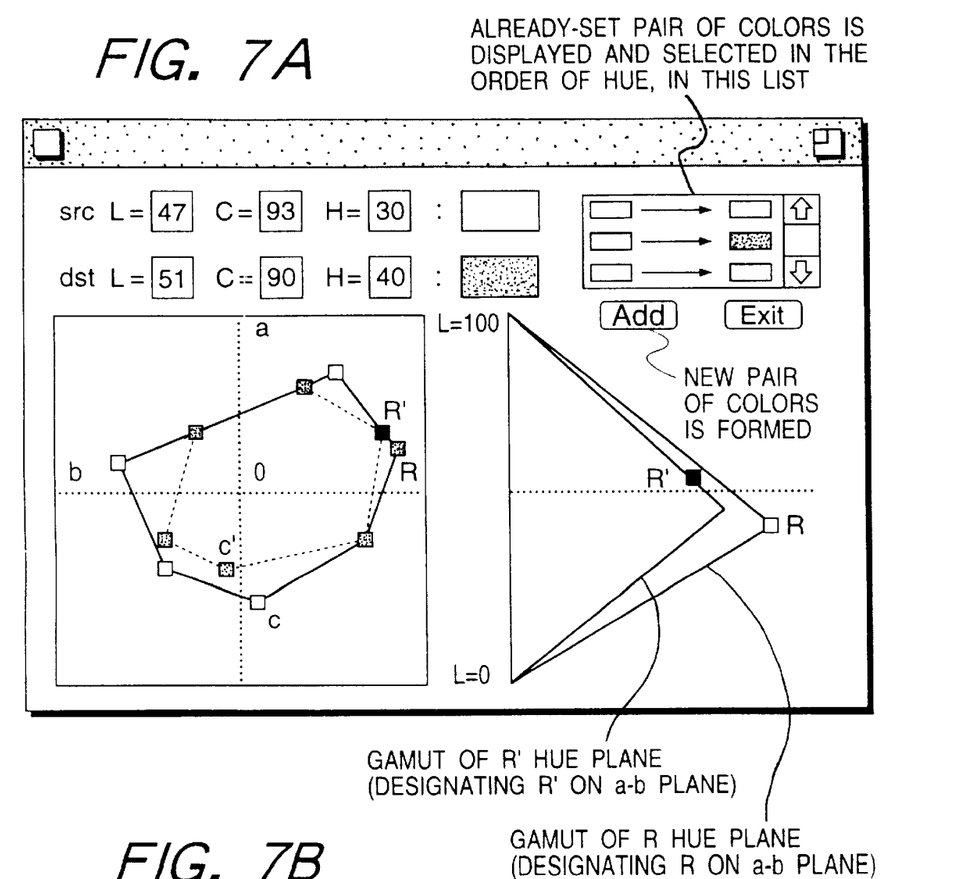
FIGS. 7A and 7B are views showing plural before and after-adjustment values to be stored in a memory device.
Figure 7B:
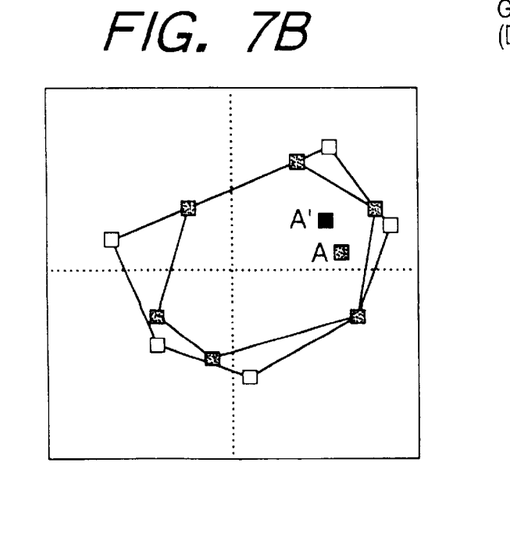

FIG. 5 is a block diagram of the central processing device 15 for realizing the color adjustment process described in the first embodiment. A plurality of before- and after-adjustment values shown in FIG. 5 are input from an input device 13 or a position indication device 12 through a data input unit 55 on the basis of such displays as shown in FIGS. 7A and 7B, to store the values in a memory device 14.

In an image processing unit 50, a desired image processing is executed to image data indicating an objected image which is input from an image input device 16 to output it to an output device (a display device 11 and an image output device 17).

The data input unit 55 and the image processing unit 50 are connected to a central processing unit (CPU) 57, a random access memory (RAM) 58 and the memory device 14 through a bus 56.

The CPU 57 produces a color correction parameter, sets the parameter which is supplied to a color revision unit 52 and controls each processing unit on the basis of a program stored in the memory device 14 and the plural before- and after-adjustment values.

In the image processing unit 50, the color adjustment described in the first embodiment and a color correction process for correcting data to image data which is adapted to the characteristic of an output device are executed to the image data indicating the target image.

In the color revision unit 52, a desired color adjustment according to a predetermined pixel is performed to image data indicating the predetermined pixel which is input through an image data input unit 51, on the basis of the color correction parameter which is set by the CPU 57.

A color correction unit 53 performs a color correction to the color-adjusted image data on the basis of the characteristic of the output device (the display device 11 or the image output device 17). A color appearance of the image data which is color adjusted on the above color correction can be faithfully reproduced on an output image.

It should be noted that the CPU 57 sets a parameter adapted to the output device which forms an image, since each output device has the different characteristic. An image formation method of the display device differs from that of the image output device. The display device 11 displays an image on the basis of R, G and B image data. On the other hand, the image output device forms an image on a recording medium utilizing a recording material corresponding to each of Y, M, C and K colors, on the basis of Y, M, C and K image data. Therefore, the color correction unit 53 converts data into data of a color system which is adapted to the output device.

An output unit 54 outputs the color corrected image data to a desired output device.

Figure 6:
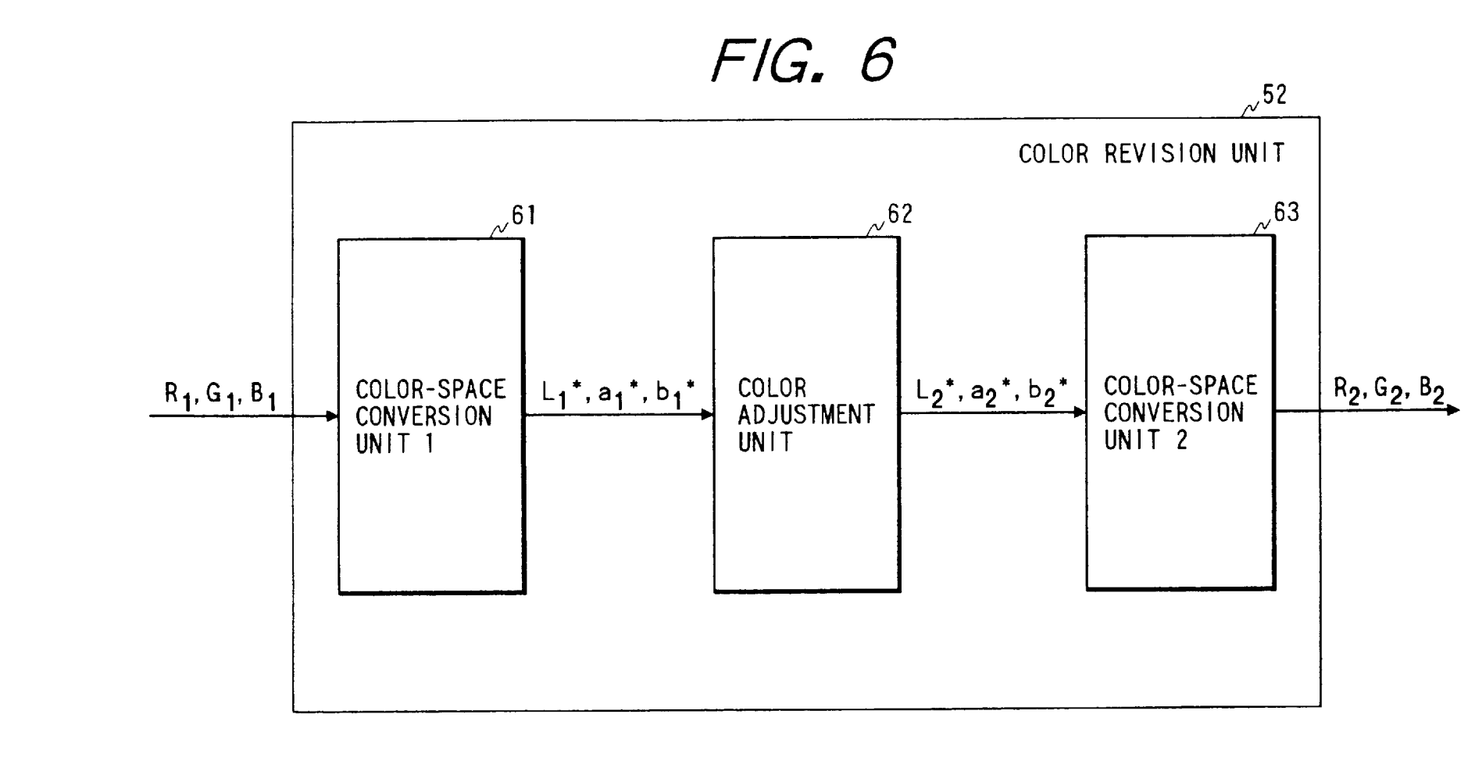
FIG. 6 is a block diagram of a color revision unit 52.

FIG. 6 is a view showing the structure of the color revision unit 52. In a color-space conversion unit 1 (61), the $R_1$, $G_1$ and $B_1$ image data indicating the target image is converted into L*, a* and b* image data on an L* a* b* color system. A color adjustment unit 62 performs the color adjustment shown in FIG. 3. The CPU 57 generates the color correction parameter used in the color adjustment on the basis of the plural before- and after-adjustment values stored in the memory device 14 (refer to steps 21 to 29 in FIG. 2).

Color-adjusted L*, a* and b* image data are respectively converted into $R_2$, $G_2$ and $B_2$ image data which is represented on a predetermined RGB color system by a color-space conversion unit 2 (63). As the predetermined RGB color system, for example, an NTSC-RGB color system may be used.

FIGS. 7A and 7B show an example of a display screen when the plural before- and after-adjustment values to be stored in the memory device are set (refer to steps 22 to 25 in FIG. 2).

As shown in FIG. 7A, such views as displaying values of L, h and c components of before- and after-adjustment values, displaying colors thereof, displaying a list of set pairs of before- and after-adjustment values, plotting such pairs on an a*–b* plane and indicating a gamut relation between before-adjustment values in a predetermined hue and the output device are shown. FIG. 7B shows the a*–b* plane when a pair of before- and after-adjustment colors is added. Here, a reference numeral A denotes a before-adjustment color and a reference numeral A' denotes an after-adjustment color.

(Another embodiment)

In the first embodiment of the present invention, the lightness component, the saturation component and the hue component of the after-adjustment color are calculated in the step 29. However, in the present embodiment, only a lightness component, a saturation component, a hue component, the lightness and the saturation components, the lightness and the hue components or the saturation and the hue components are calculated.

That is, a user may preferably select components to be color adjusted by instructing the components to be color adjusted from a console unit (not shown).

For the components which are not selected, a color adjustment is not performed, for example, by setting an adjustment parameter which omits a conversion process or providing such a constitution as a color adjustment process is passed through.

In the first embodiment of the present invention, the pair of before- and after-adjustment colors is input in the steps 22 and 23 by using the input device 13. However, in the present embodiment, the user may input a pair of before- and after-adjustment colors by instructing colors of an image or the like displayed on a display device 11 using a position indication device 12 or utilizing the pair of before-and after-adjustment colors which have been previously stored in a memory device 14.

In the first embodiment of the present invention, a color to be color adjusted is input using the input device 13 in the step 26 to output a color which has been color adjusted on the display device 11 in the step 2A. However, the present invention is not limited to the above-mentioned example, and may be performed by the color adjustment process to image data utilizing a form of palette, wherein a color which is input in a step 26 is responded to after performing a color adjustment obtained in the step 2A.

The process from the step 26 to the step 2A may be executed every time for each of input data indicating an object image without using the palette.

The process may be executed on a part of an object image.

In a step 2D of the present embodiment, a saturation component c' of a color x' after performing the color adjustment to a color x may be calculated as follows.

$$\begin{cases} C' = \left(C^{\log c'_R/\log c_R}\right) \times \frac{\Delta h_L}{\Delta h_{LR}} + \left(C^{\log c'_L/\log c_L}\right) \times \frac{\Delta h_R}{\Delta h_{LR}} & (N \neq 1), \\ C' = C^{\log c'_R/\log c_R} & (N = 1) \end{cases}$$

In the present embodiment, the hue component, the saturation component and the lightness component of a color depend on a CIE1976 (L* a* b*) color space. However, the hue component, the saturation component and the lightness component which depend on a CIE1976 (L* u* v*) color space, an HSV color representation system depending on a display characteristic or an HLS color representation system may be used.

That is, a color space which is expressed by the hue component, the saturation component and the lightness component may be acceptable.

As described above, according to the present invention, an image which can obtain a desired impression can be simply provided by performing the color adjustment on the basis of a color adjustment parameter which responds to input image data.

Also, the color adjustment process does not influence an achromatic color when the colors are adjusted.

What is claimed is:

1. An image processing apparatus comprising:

storage means for storing plural pairs of before- and after-adjustment colors;

input means of inputting color data including components of lightness, hue and saturation;

first adjustment means for adjusting a hue component of the color data, according to hue components of the stored plural pairs of before- and after-adjustment colors;

second adjustment means for adjusting other color components of the color data, according to hue components and other color components of the stored plural pairs of before- and after-adjustment color; and output means for outputting output color data including the adjusted hue component adjusted by said first adjustment means and the other adjusted components adjusted by said second adjustment means.

2. An apparatus according to claim 1, further comprising selection means for selecting the plural pairs of before- and after-adjustment colors from said storage means, according to the hue component of the color data, and wherein said first adjustment means adjusts the hue component of the color data according to the hue component of the color data and the hue components of the selected plural pairs of before- and after-adjustment colors.

3. An apparatus according to claim 2, wherein said second adjustment means adjusts a saturation component of the color data, according to the hue components and saturation components of the plural pairs of before- and after-adjustment colors.

4. An apparatus according to claim 2, wherein said second adjustment means adjusts a lightness component of the color data, according to the hue components, saturation components and lightness components of the plural pairs of before- and after-adjustment colors.

5. An apparatus according to claim 1, further comprising instruction means for instructing which of the hue, saturation and lightness components is to be adjusted.

6. An apparatus according to claim 1, further comprising a user interface for indicating the pairs of before- and after-adjustment colors.

7. An apparatus according to claim 6 wherein said user interface displays a gamut of an output device.

8. A computer implementable method of operating an image processing apparatus comprising:

a storage area step of storing plural pairs of before- and after-adjustment colors in a storage device;

an input step of inputting color data including components of lightness, hue and saturation;

a first adjustment step of adjusting a hue component of the color data, according to hue components of the stored plural pairs of before- and after-adjustment colors;

a second adjustment step of adjusting other color components of the color data, according to hue components and other color components of the stored plural pairs of before- and after-adjustment color; and an output step of outputting, to an image output device for reproductions, output color data including the adjusted hue component adjusted by said first adjustment means and the other adjusted components adjusted by said second adjustment means.

* * * * *

UNITED STATES PATENT AND TRADEMARK OFFICE
CERTIFICATE OF CORRECTION

PATENT NO. : 6,163,321
DATED : December 19, 2000
INVENTOR(S) : Jun Kiyokawa

It is certified that error appears in the above-identified patent and that said Letters Patent is hereby corrected as shown below:

Column 3,
Line 15, "color" should read -- colors --; and
Line 60, "$C'_R$" should read -- $c'_R$ --.

Column 4,
Line 2, "$x_L$." (first occurrence) should read -- $x'_L$. --;
Line 4, "$C'_L$" should read -- $c'_L$ --.

Signed and Sealed this

Twentieth Day of November, 2001

Attest:

NICHOLAS P. GODICI
Attesting Officer
Acting Director of the United States Patent and Trademark Office